United States Patent [19]

Ramunas et al.

[11] Patent Number: 5,236,207
[45] Date of Patent: Aug. 17, 1993

[54] SEGMENTED ADJUSTABLE TOP JAW FOR A CHUCK AND METHOD FOR USING THE SAME

[75] Inventors: Valdas S. Ramunas, Euclid; Richard N. Monday, Aurora, both of Ohio

[73] Assignee: Kennametal Inc., Latrobe, Pa.

[21] Appl. No.: 889,867

[22] Filed: May 28, 1992

[51] Int. Cl.⁵ .............................................. B23B 31/16
[52] U.S. Cl. ..................................... 279/123; 279/153
[58] Field of Search ........................ 279/123, 153, 2.05, 279/4.05, 139

[56] References Cited

U.S. PATENT DOCUMENTS

| | | |
|---|---|---|
| 242,173 | 5/1881 | Whitehead . |
| 3,097,548 | 7/1963 | Johnson ................................. 77/58 |
| 3,244,429 | 4/1966 | Walker et al. ....................... 279/110 |
| 4,221,391 | 9/1980 | Dutton ................................. 279/123 |
| 4,353,561 | 10/1982 | Peterson ............................. 279/123 |
| 4,772,034 | 9/1988 | Brown ................................. 279/1 SJ |
| 4,780,029 | 10/1988 | Beck .................................... 407/89 |
| 4,928,981 | 5/1990 | Brown ................................. 279/1 SJ |

OTHER PUBLICATIONS

"Compensating Chuck Jaws", by Charles Homewood, in *American Machinist*, Nov. 6, 1924, p. 744.

*Primary Examiner*—Steven C. Bishop
*Attorney, Agent, or Firm*—James G. Porcelli

[57] ABSTRACT

A segmented adjustable top jaw (25) capable of being mounted upon a chuck has a slot (100) partially extending the length of the jaw (25) and defining a body inner portion (105), a body outer portion (110) with a gripping surface (30), and a hinge (115) therebetween. Upon mounting the body inner portion (105) to the lathe, concentricity among cooperating top jaws (25) may be provided by deflecting the body outer portion (110) toward or away from the body inner portion (105) about the hinge (115), thereby causing the gripping surface (30) of the jaw (25) to rotate about the hinge (115) resulting in an upward or downward movement of the gripping surface (30).

16 Claims, 3 Drawing Sheets

SEGMENTED ADJUSTABLE TOP JAW FOR A CHUCK AND METHOD FOR USING THE SAME

BACKGROUND OF THE INVENTION

This invention relates to a chuck and more specifically, to the workholding top jaw of a chuck.

A chuck consists of a body with inserted workholding jaws that slide radially in slots on the chuck and are actuated by various mechanisms such as screws, scrolls, levers and cams, alone or in a variety of combinations. Typically, a workpiece will be secured to a chuck by radially positioning the workholding jaws against the outer surface of the workpiece. As an example, FIG. 1, which is prior art, shows a three-jaw chuck having a chuck body 10, which may be formed of a one-piece steel casting, mounted upon the spindle (not shown) of a machine for securing a workpiece 15. Three chuck jaws 20 on the chuck body 10 are operated upon to effect simultaneous gripping action on the workpiece 15. The chuck body 10, chuck jaws 20 and operating components are of an entirely conventional nature and will not be described in detail. The construction and operation of the mechanism for jaw positioning is also well understood by those skilled in the art and further elaboration will not be provided.

Throughout this discussion reference will be made to one of what will be multiple chuck jaws 20 and their associated components. For that reason only one set of jaws 20 and associated components will be discussed in detail with the understanding that such a discussion is applicable to the other chuck jaws.

In order to secure the workpiece 15 the chuck jaws 20 are radially urged along a radial axis 21 against the workpiece 15 such that the workpiece 15 is securely held in place about a longitudinal axis 22, which is the chuck 10 centerline. In typical chucking operations the force exerted on the workpiece 15 by the chuck jaws 20 is substantial and may be high enough to deform the surface of the workpiece 15. By design, the material of the chuck jaws is typically softer than the material of the associated workpiece 15. In this manner any damage that may occur would occur to the chuck jaws 20. For this reason each chuck jaw 20 is provided with an additional removeable jaw, known as a top jaw 25.

A top jaw 25 may be secured to a receiving face 27 of each chuck jaw 20, thereby alleviating the need to replace a chuck jaw 20 in favor of replacing the top jaw 25 which may be relatively easily removed or secured to the chuck jaws 20 using a means for securing such as threaded bolts. In this manner the chuck 10 may be easily maintained by simply replacing each top jaw 25 when it becomes damaged.

A critical consideration when utilizing chucks is the proper positioning of the workpiece 15. Often times the workpiece 15 must be positioned with tolerances in the thousandths of inches. The positioning of a top jaw 25 about a workpiece, even when properly mounted to the chuck jaw 20, requires adjustment. This is typically accomplished by mounting the top jaw 25 upon the chuck jaw 20 and boring the gripping surface 30 of each top jaw 25 to provide a desired level of concentricity among the gripping surfaces 30 of the top jaws 25. However, after these top jaws 25 are used and become damaged they must then be replaced and a new set of top jaws 25 must be mounted and once again bored to the proper concentricity.

Boring these top jaws 25 can be a time consuming operation. Furthermore, each jaw 25 has limited material allowed for reboring and once that limit is reached, the jaws 25 have to be replaced with new ones and the boring process repeated.

An object of this invention is to alleviate the need for a boring operation each time a new set of top jaws is mounted upon the chuck jaws.

A further object of this invention is to provide a top jaw configuration that alleviates this need for boring but at the same time is compatible with existing chuck bodies.

Still another object of this invention is to provide an arrangement in which the top jaws may be manually adjusted to provide the concentricity necessary to properly support a workpiece.

Still another object of this invention is to provide a design modification to existing chucks which could be simple and inexpensive to implement while still providing the manual adjustment for concentricity necessary to alleviate the need for reboring.

SUMMARY OF THE INVENTION

The invention provides a segmented adjustable top jaw capable of being mounted upon a chuck and radially movable about the longitudinal axis of the chuck and having a gripping surface which generally conforms to a workpiece. The jaw is comprised of a body having a top and bottom face, an inner and outer face and a radial axis extending through the body top face and bottom face. Furthermore the body has a slot extending from the top face through the body toward the bottom face to define a body outer portion with the gripping surface, a body inner portion and a hinge therebetween. A means is provided for repelling and retracting the body outer portion relative to the body inner portion to conform the gripping surface to the workpiece.

In one embodiment, the means for repelling is comprised of a repelling bore within the body extending through the body outer portion. The means for repelling is further comprised of a repelling bolt engaged within the repelling bore at the body outer portion such that advancing the repelling bolt toward the body inner portion will cause the repelling bolt to contact the body inner portion and will thereby urge the body outer portion away from the body inner portion causing the gripping surface to deflect downward.

The means for retracting is comprised of a retracting bore extending through the body outer portion and into the body inner portion. The means for retracting is further comprised of a retracting bolt having a bolt head larger than the retracting bore, engaged within the retracting bore at the body inner portion and abutting the body outer portion with the bolt head such that advancing the retracting bolt will urge the body outer portion toward the body inner portion causing the gripping surface to deflect upward.

In a second embodiment of the invention, a common bore is utilized for both the means for repelling and the means for retracting. In this instance the means for repelling is comprised of a repelling bore within the body extending through the body outer portion. The means for repelling is further comprised of a repelling ring engaged within the repelling bore at the body outer portion. Advancing the repelling ring toward the body inner portion will cause the repelling ring to contact the body inner portion and will thereby urge the body outer portion away from the body inner portion causing the gripping surface to deflect downward.

The means for retracting is comprised of a retracting bore which extends through the repelling ring an further extends into the body inner portion. The means for retracting is further comprised of a retracting bolt having a bolt head larger than the repelling ring. The retracting bolt extends through the repelling ring and is capable of engagement within the body inner portion such that the retracting bolt may be extended through the repelling ring and advanced within the body inner portion until the retracting bolt head abuts against the repelling ring. This causes the body outer portion to be drawn toward the body inner portion thereby causing the gripping surface to deflect upward.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
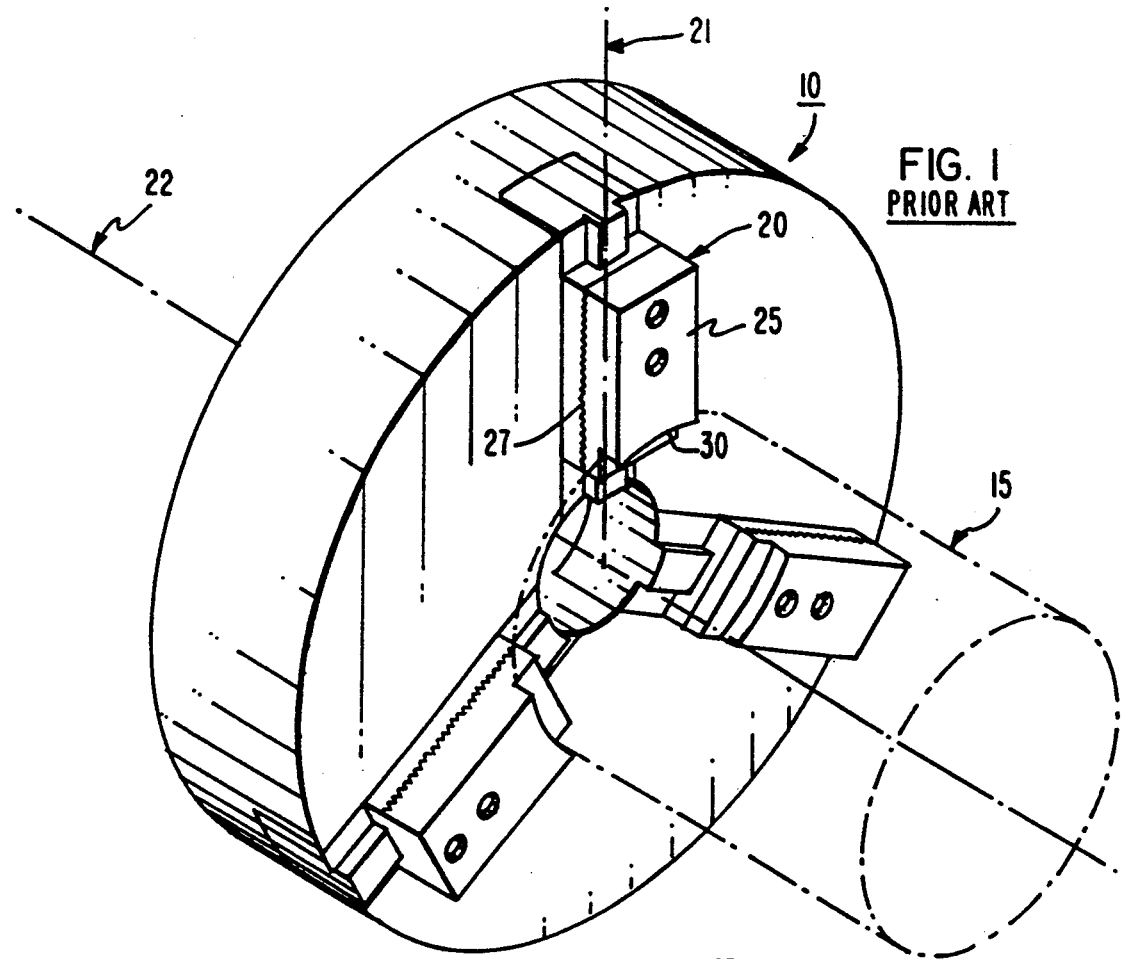
FIG. 1 is an isometric view showing prior art of a chuck body with chuck jaws and top jaws.
Figure 2:
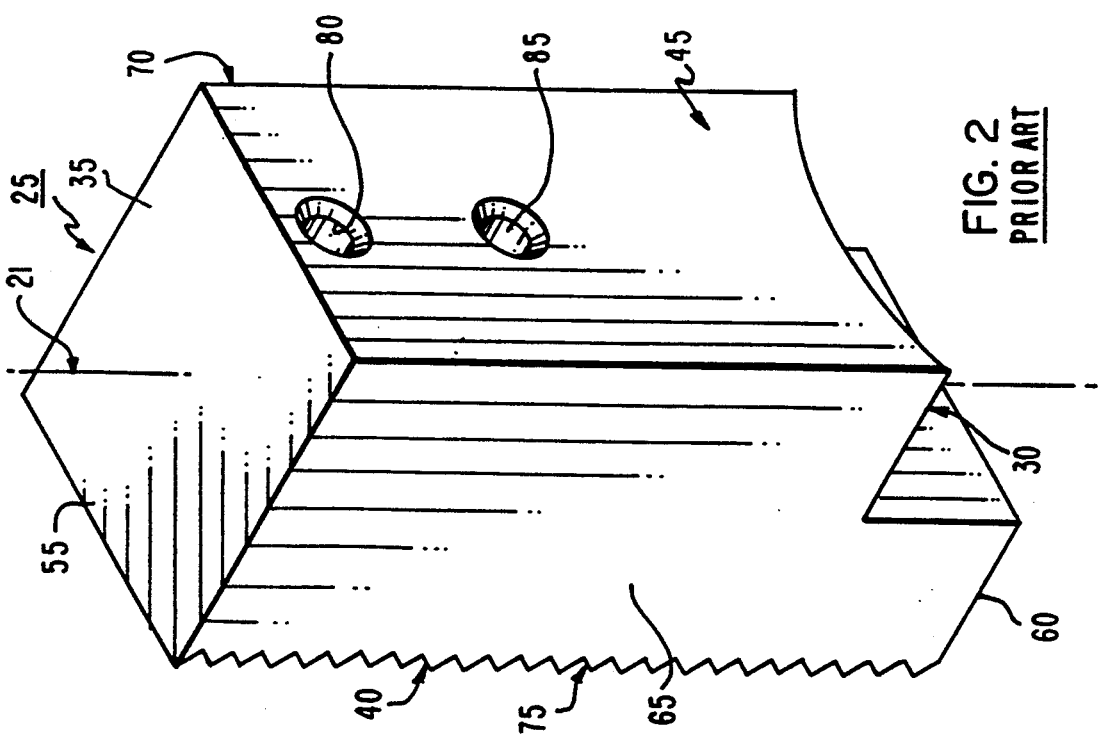
FIG. 2 is also prior art and shows an isometric view of a top jaw shown in FIG. 1.

FIG. 2 shows an isometric view of a top jaw 25 similar to that found in FIG. 1. Such a top jaw 25 is prior art and is commercially available. Generally the top jaw 25 consists of a jaw body 35 having an inner face 40 and an outer face 45. A radial axis 21 extends between a top face 55 and a bottom face 60 in a direction radial to the chuck centerline 22. The bottom face 60 has a gripping surface 30. The top jaw 25 further includes sides 65 and 70. The inner face 40 of the top jaw 25 mates with the receiving face 27 (FIG. 1) of a chuck jaw 20.

On the inner face 40 is a shift-preventing means 75, such as serrations, which engage a similar shift-preventing means on the chuck jaw 20 to eliminate relative radial motion between the top jaw 25 and the chuck jaw 20. The top jaw 25 is secured to the chuck jaw 20 using bolts (not shown) through bores 80 and 85 extending from the outer face 45 of the top jaw 25 through the inner face 40 and connected to the chuck jaw 20.

The top jaw 25 shown in FIGS. 1 and 2 is essentially a solid block attached to a chuck jaw 20 through bores 80 and 85 and contacting the workpiece 15 at the gripping surface 30. As mentioned before, once each top jaw 25 is mounted, if all of the top jaws 25 on the chuck body 10 do not together provide a gripping surface which is concentric about the workpiece 15, then these gripping surfaces 30 must be bored to produce such concentricity.

Figure 3:
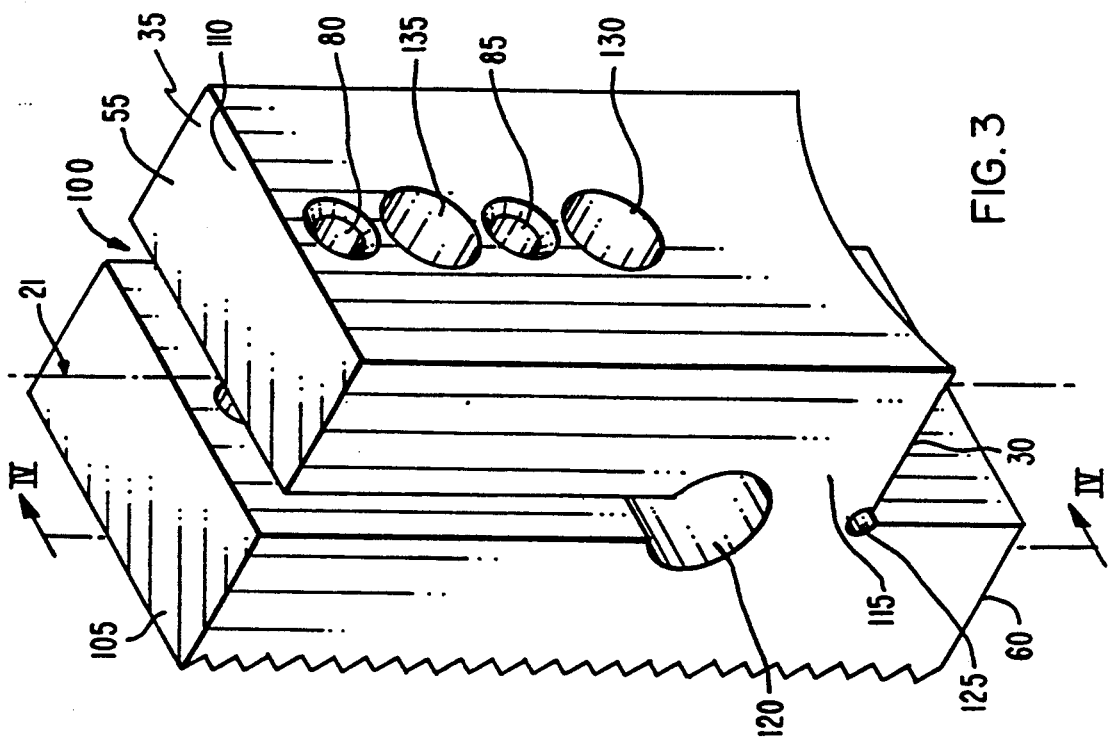
FIG. 3 is an isometric view of a top jaw modified to be adjustable in accordance with a first embodiment of the present invention.

With this in mind, FIG. 3 shows one embodiment of the invention. While what will be described are modifications to the body 35 shown in FIG. 2 similar modifications may be made to a variety of other top jaws having different shapes. For simplicity, the item numbering found in FIGS. 1 and 2 will be maintained throughout this discussion.

The first embodiment of the present invention involves essentially two modifications to the top jaw 25 shown in FIG. 2. As shown in FIG. 3, a slot 100 extending from the top face 55 through the body 35 toward the bottom face 60 acts to define a body inner portion 105 and a body outer portion 110 with a gripping surface 30. The body outer portion 110 remains secured to the body inner portion 105 through the remaining portion of common material between the body inner portion 105 and the body outer portion 110 which acts as a hinge 115.

It can be appreciated that moving the body outer portion 110 relative to the body inner portion 105 at the top face 55 would cause rotation about hinge 115 thereby causing the gripping surface 30 to rotate slightly about the hinge 115. However, the primary motion of this rotation will be a vertical displacement along the radial axis 21. It is in this manner that the gripping surface 30 of one top jaw 25 may be repositioned such that in conjunction with other top jaws on a chuck body, concentricity may be established about a workpiece.

To minimize concentration of mechanical stress at discontinuous surfaces, continuous curved surfaces 120 and 125 may be provided at the closed end of the slot 100 and at the transition area between the gripping surface 30 and the bottom face 60.

While what has been described is the configuration of the top jaw 25 having a slot and the manner by which the gripping surface 30 may be displaced through rotation of the body outer portion 110 toward or away from the body inner portion 105, the mechanism for producing such displacement has not yet been described. As previously mentioned, the top jaw 25 is secured to the chuck jaw 20 through bolts extending through bores 80 and 85 and engaging the chuck jaw 20.

In addition to these bores included in the top jaw body 35 is a means for deflecting the body outer portion 110 relative to the body inner portion 105 to conform the gripping surface 30 to the workpiece. The means for deflecting may be comprised of a repelling bore 130 within the body 35 which extends through the body outer portion 110 and of a retracting bore 135 which extends through the body outer portion 110 and into the body inner portion 105. It should be clear that the positions of these bores 130 and 135 may be interchanged or shifted because, as will be appreciated, their operation is not dictated by a precise radial location on the top jaw 25.

Figure 4:
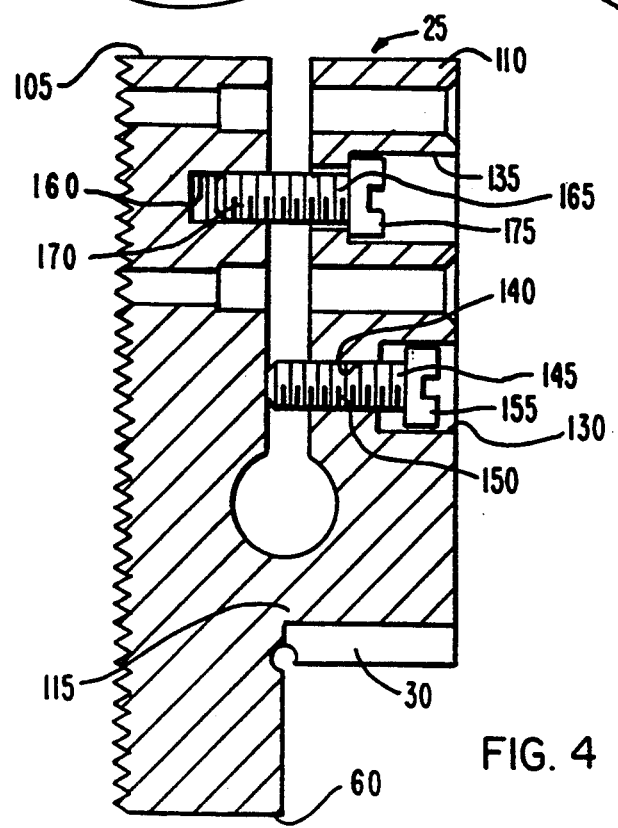
FIG. 4 is a sectional side view of the top jaw along line "IV—IV" shown in FIG. 3 in accordance with the present invention.

FIG. 4 shows a cross-section of the top jaw 25 illustrated in FIG. 3 and provides details of the means for deflecting the body outer portion 110 relative to the body inner portion 105 to conform the gripping surface 30 to a workpiece. The repelling bore 130 has a threaded portion 140 to receive a bolt 145 having bolt threads 150 compatible with those of the threaded portion 140. By rotation of a bolt head 155, the bolt 145 may be advanced against the body inner portion 105 thereby urging the body outer portion 110 away from the body inner portion 105 and essentially causing downward displacement of the gripping surface 30 at the bottom face 60.

While that portion of the repelling bore 130 proximate to the bolt head 155 has a countersunk portion and is larger than that portion of the bore through which the bolt 145 is threaded, it should be appreciated that aside from recessing the bolt head 155 within the top jaw 25 it is not necessary for the bolt head 155 to have a larger diameter than the bolt 145. For this reason the repelling bore 130 may be a uniform diameter.

Retracting bore 135 has a threaded portion 160 in the body inner portion 105 to accept a bolt 165 by engagement with the bolt threads 170. The bolt 165 engages the body outer portion 110 only at the bolt head 175 and the bolt threads 170 have adequate clearance within the retracting bore 135 to avoid contact with the body outer portion 110. In this manner, when the bolt 165 is advanced, the body outer portion 110 is pulled toward the body inner portion 105 thereby causing rotation of the body outer portion 110 about the hinge 115 resulting in upward displacement of the gripping surface 30.

Just as before, while there is benefit in recessing the bolt 165 within the top jaw 25, it is not necessary to provide the retracting bore 135 with a countersunk portion to accommodate a bolt head 175. If the retracting bore 135 were of a uniform diameter throughout, then the bolt head 175 would contact the outer face 45 of the body outer portion 110 to urge the body outer portion 110 toward the body inner portion 105.

What has been described is a means for repelling the body outer portion 110 from the body inner portion 105 in order to displace the gripping surface 30 at the bottom face 60 in the downward direction. What has also been described is the means for retracting the body outer portion 110 toward the body inner portion 105 thereby providing upward movement to the gripping surface 30 at the bottom face 60. It should be appreciated in order for each of these movements to occur there must be cooperation between the bolts 145 and 165.

Specifically, to repel the body outer portion 110 from the body inner portion 105, it is necessary to advance bolt 155. However, it is also necessary to ensure that bolt 165 within the retracting bore 135 is sufficiently withdrawn to permit the necessary movement of the body outer portion 110 from the body inner portion 105.

In the alternative, for retracting the body outer portion 110 toward the body inner portion 105, when the bolt 165 is advanced, the bolt 145 should be withdrawn sufficiently to permit the movement of the body outer portion 110 toward the body inner portion 105.

It is possible to provide both retracting and repelling motion through the use of a single bore. In a second embodiment of the invention, shown in FIG. 5, such a single bore 200 is shown having a first threaded portion 205 with one diameter and a second threaded portion 210 with a smaller diameter (See also FIG. 6). In order to repel the body outer portion 110 from the body inner portion 105, a ring 215 having threads 217 on its outer diameter which are compatible with those threads found within the first threaded portion 205 is advanced within the bore 200 until the ring 215 contacts the body inner portion 105. The ring 215 may then be further advanced thereby separating by the desired distance the body outer portion 110 from the body inner portion 105. Bolt 220 is shown in FIGS. 5 and 6 in a position separated from the jaw 25 for perspective and will be discussed in the engaged position with the discussion of FIG. 7.

Figure 7:
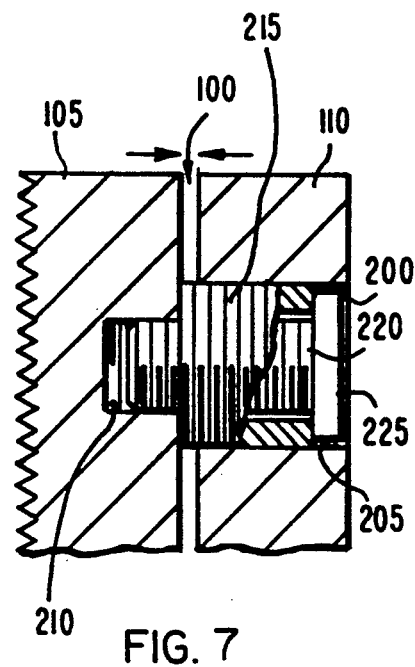
FIG. 7 is a sketch showing the top jaw in FIG. 5 operated to retract the outer body portion toward the body inner portion.

Returning to FIG. 5, in the alternative, when it is desired to retract the body outer portion 110 toward the body inner portion 105, then the ring 215 is retracted from the bore 200 to the desired distance and a bolt 220 having an external diameter with threads 222 compatible with those in the second threaded portion 210 of the body inner portion 105 is advanced through the inner diameter of ring 215 (See also FIG. 7). Ring 215 has adequate clearance to avoid interference with the threads of bolt 220. Bolt 220 is then engaged with the second threaded portion 210 and is advanced within the second threaded portion 210 until the bolt head 225 abuts ring 215. At this point, further advancing of bolt 220 will draw the body outer portion 110 toward the body inner portion 105 a desired distance.

In order to provide a locking feature for this arrangement, it is possible to advance the ring 215 so that it slightly protrudes from the body outer portion 110 into the slot 100 area and then proceed, using bolt 220, to draw the body inner portion 105 to abut against the ring 215. In this manner bolt 220 may be further advanced and essentially locked with ring 215. This is illustrated in FIG. 7.

Figure 5:
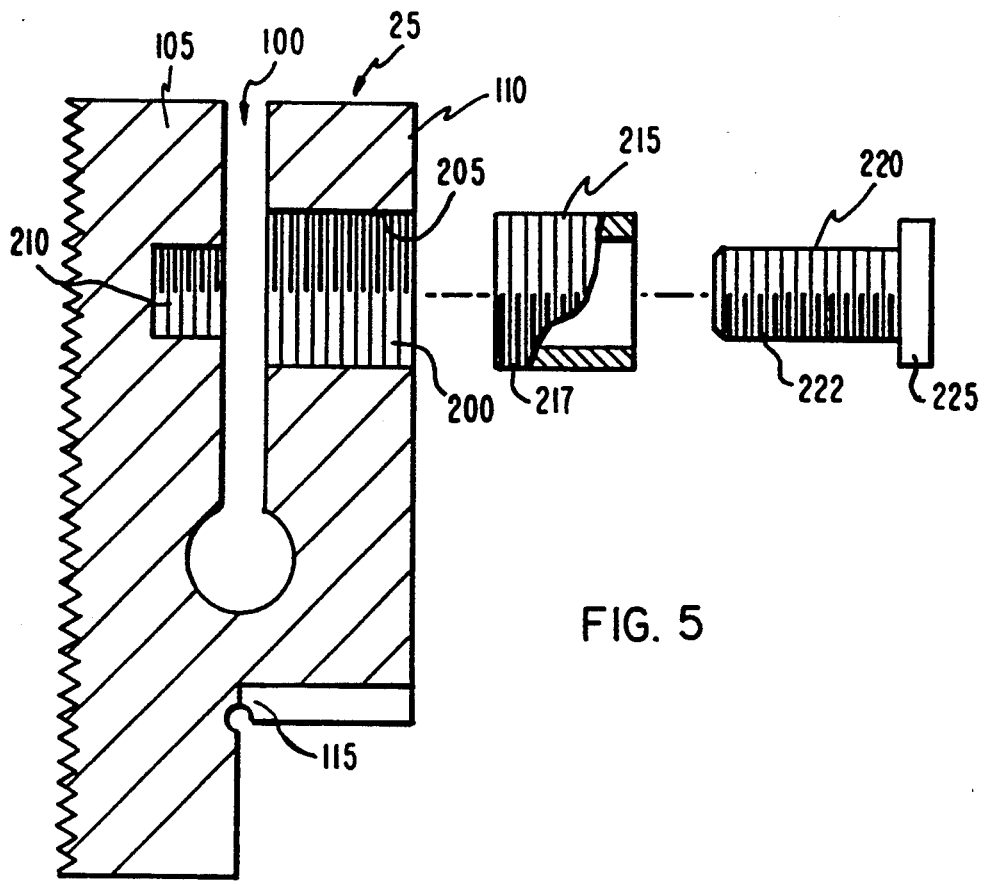
FIG. 5 is a sectional side view of the top jaw in accordance a second embodiment of the present invention.
Figure 6:
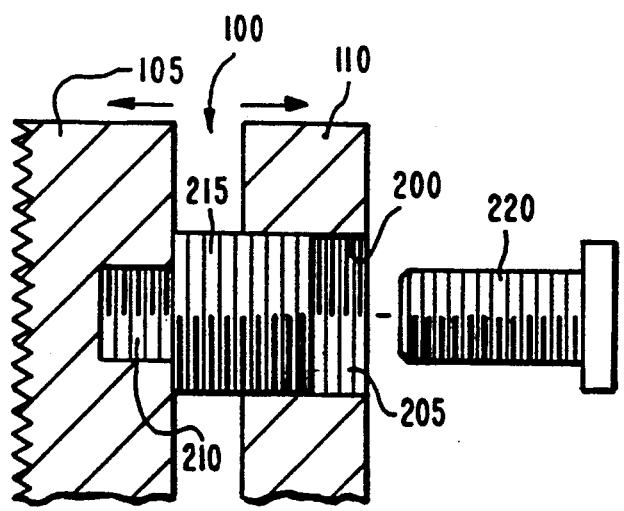
FIG. 6 is a sketch showing the top jaw in FIG. 5 operated to repel the outer body portion from the body inner portion.

From a comparison of FIG. 5 with FIG. 4, it may be seen that the embodiment in FIG. 5 could be duplicated if the retracting bore 13 and associated bolt 165 were removed and a bore was provided through bolt 145 to a threaded portion of the body inner portion 105. A bolt through the bolt 145 and threaded into the body inner portion 105 would provide equivalent motions to that provided by the retracting bore 135 and the associated hardware.

What has been described is a segmented adjustable top jaw that may be used in conjunction with other similar top jaws to provide concentricity for a workpiece without the need to perform a separate boring operation to provide such concentricity.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A segmented adjustable top jaw capable of being mounted upon a chuck and radially movable about the radial axis of the lathe chuck and having a gripping surface which generally conforms to a workpiece, the jaw comprised of:
   a) a body having a top and bottom face, an inner and outer face and a radial axis extending through the body top face and bottom face;
   b) the body having a slot extending from the top face through the body toward the bottom face thereby defining a body outer portion with the gripping surface, a body inner portion and a hinge therebetween;
   c) means for deflecting the body outer portion relative to the body inner portion to position the gripping surface to the workpiece; and
   d) said means for deflecting is comprised of means for pushing the body outer portion from the body inner portion and means for pulling the body outer portion toward the body inner portion.

2. The apparatus according to claim 1 wherein the means for pushing is comprised of a repelling bore within the body extending through the body outer portion and further comprising a repelling bolt engaged within the repelling bore at the body outer portion such that advancing the repelling bolt toward the body inner portion will cause the repelling bolt to contact the body inner portion and will thereby push the body outer portion away from the body inner portion causing the gripping surface to deflect downward.

3. The apparatus according to claim 2, wherein the repelling bolt is threadingly mated within the repelling bore in the body outer portion.

4. The apparatus according to claim 1 wherein the means for pulling is comprised of a retracting bore extending through the body outer portion and into the body inner portion and further comprised of a retracting bolt having a bolt head larger than the retracting bore, engaged within the retracting bore at the body inner portion and abutting the body outer portion with the bolt head such that advancing the retracting bolt will pull the body outer portion toward the body inner portion causing the gripping surface to deflect upward.

5. The apparatus according to claim 4 wherein the retracting bolt is threadingly mated within the retracting bore in the body inner portion.

6. The apparatus according to claim 1 wherein:
   a) the means for pushing is comprised of a repelling bore extending through the body outer portion and a repelling bolt engaged within the repelling bore such that advancing the repelling bolt will push the body outer portion away from the body inner portion causing the gripping surface to deflect downward and;
   b) the means for pulling is comprised of a retracting bore extending through the body outer portion and into the body inner portion and a retracting bolt secured within the retracting bore at the body inner portion such that advancing the retracting bolt will pull the body outer portion toward the body inner portion causing the gripping surface to deflect upward.

7. The apparatus according to claim 1 wherein the means for pulling and the means for pushing utilize a common bore through the body outer portion.

8. The apparatus according to claim 7 wherein:
   a) the mans for pushing is comprised of a repelling bore within the body extending through the body outer portion and further comprising a repelling ring engaged within the repelling bore at the body outer portion such that advancing the repelling ring toward the body inner portion will cause the repelling ring to contact the body inner portion and will thereby push the body outer portion away from the body inner portion causing the gripping surface to deflect downward and
   b) the means for pulling is comprised of a retracting bore which extends through the repelling ring and further extends into the body inner portion and is further comprised of a retracting bolt having a bolt head larger than the repelling ring, said retracting bolt extending through the repelling ring and capable of engagement within the body inner portion such that the retracting bolt may be extended through the repelling ring and advanced within the body inner portion until the retracting bolt head abuts against the repelling ring and causes the body outer portion to be pulled toward the body inner portion thereby causing the gripping surface to deflect upward.

9. The apparatus according to claim 8 wherein the repelling ring is threadingly mated within the repelling bore in the body outer portion such that advancing the ring by rotation will push the body outer portion away from the body inner portion and deflect the gripping surface downward.

10. The apparatus according to claim 9 wherein the retracting bolt is threadingly mated within the retracting bore at the body inner portion such that advancing the retracting bolt by rotation will pull the body outer portion toward the body inner portion and displace the gripping surface upward.

11. The apparatus according to claim 1 wherein the thickness of the slot is approximately 0.5 inches.

12. The apparatus according to claim 1 wherein the slot terminates at a curved surface connecting the body outer portion and bottom portion to reduce stress concentration.

13. The apparatus according to claim 1 wherein the gripping surface is inset from the bottom face.

14. A method for adjusting a top jaw having a body with a top and bottom face and a gripping surface at the bottom face which generally conforms to a workpiece, the jaw capable of being mounted upon a lathe chuck and radially movable about the centerline of a lathe chuck, the method comprising the steps of:
   a) providing a slot extending from the top face toward the bottom face thereby defining a body inner portion, a body outer portion and a hinge therebetween and;
   b) pulling the body outer portion toward or pushing the body outer portion away from the body inner portion to deflect the gripping surface upward or downward respectively.

15. A segmented adjustable top jaw capable of being mounted upon a chuck and radially movable about the radial axis of the lathe chuck and having a gripping surface which generally conforms to a workpiece, the jaw comprised of:
   a) a body having a top and bottom face, an inner and outer face and a radial axis extending through the body top face and bottom face;
   b) the body having a slot extending from the top face through the body toward the bottom face thereby defining a body outer portion with the gripping surface, a body inner portion and a hinge therebetween;
   c) means for deflecting the body outer portion relative to the body inner portion to conform the gripping surface to the workpiece; and
   d) said means for deflecting is comprised of;
      1) means for repelling the body outer portion from the body inner portion, and
      2) means for retracting the body outer portion toward the body inner portion, said means for retracting comprised of a retracting bore extending through the body outer portion and into the body inner portion and further comprised of a retracting bolt having a bolt head larger than the retracting bore, engaged within the retracting bore at the body inner portion and abutting the body outer portion with the bolt head such that advancing the retracting bolt will urge the body outer portion toward the body inner portion causing the gripping surface to deflect upward.

16. The apparatus according to claim 15 wherein the retracting bolt is threadingly mated within the retracting bore in the body inner portion.

* * * * *